United States Patent

[11] 3,604,599

| [72] | Inventor | Ray S. Richmond<br>Placitas, N. Mex. |
|---|---|---|
| [21] | Appl. No. | 17,556 |
| [22] | Filed | Mar. 9, 1970 |
| [45] | Patented | Sept. 14, 1971 |
| [73] | Assignee | The Singer Company<br>New York, N.Y. |

[54] APPARATUS FOR DISPENSING FLOWABLE MATERIAL
10 Claims, 3 Drawing Figs.

[52] U.S. Cl. .................................................. 222/252,
222/167, 222/410, 222/413
[51] Int. Cl. .................................................. G01f 13/00
[50] Field of Search .......................................... 222/167,
413, 252, 254, 411, 410; 198/209

[56] References Cited
UNITED STATES PATENTS

| 2,154,325 | 4/1939 | Grothers ....................... | 222/254 |
| 2,797,070 | 6/1957 | Winn, Jr. et al. ............... | 222/167 X |
| 3,561,823 | 2/1971 | Meuret .......................... | 198/209 X |

*Primary Examiner*—Samuel F. Coleman
*Attorneys*—Patrick J. Schlesinger, Charles R. Lepchinsky, Warren P. Kujawa and Jay M. Cantor

ABSTRACT: A squirrel cage dispenser for metering precise amounts of flowable material, such as toner powder used in electrostatic copiers. A cylindrical cage is mounted in a housing for rotation about an axis and has a concentrically mounted auger received by a split tube having an exit portion external to the housing. As the cage rotates, the material is elevated to the top of the housing interior by circumferential vanes, is allowed to cascade down onto the split tube, and is augered to the exit portion at a rate proportional to the rotational speed of the cage and auger.

APPARATUS FOR DISPENSING FLOWABLE MATERIAL

BACKGROUND OF THE INVENTION

1. Field of the Invention

This invention relates to apparatus for dispensing flowable materials, particularly friable materials, such as the toner powder used in dry electrostatic copiers, in precise amounts.

2. Description of the Prior Art

Many types of dispensers have been utilized for dispensing flowable materials, such as grout or friable solids, all having varied configurations and characteristics. The toothpaste tube, the common grease gun, the bucket conveyor, and the ordinary meat grinder are all examples which illustrate the variety of devices employed to solve particular needs.

In some applications, a dispenser is required which has a chamber capable of holding a generous quantity of the material to be dispensed in order to eliminate the need for frequent replenishing and the attendant inconvenience of frequent checking of the quantity of material remaining in the device. In such applications, it is highly desirable to have some arrangement for providing quick and easy refilling of the dispenser chamber when required in order to reduce the downtime of other apparatus associated with the dispenser. Since many materials contain dyes or other chemicals which are injurious to a wide variety of substances, it is also a requirement that the arrangement for refilling eliminate any spilling of the material to be dispensed.

Other applications require a device which can meter out precise quantities of a flowable material. This task is often complicated by the fact that some flowable materials have a tendency to agglomerate into relatively large clusters or clumps under varying conditions of humidity and temperature. Such clusters then accumulate in various portions of the dispensing apparatus, thereby impeding the passage of material and sometimes interrupting the flow of material entirely. This resulting impairment of the dispenser operation frequently necessitates costly and time-consuming shutdown of the associated apparatus in order to remove the obstructing clusters of material.

A further complicating factor in still other applications is the high surface friction of some flowable materials, such as the resin toners used in electrostatic copier machines. When an attempt is made to convey such materials by means of an auger or feed screw, this high surface friction causes the material to pack tightly along the fee path. Frequently, when the material reaches the exit portion of the feed path, it has been packed into clusters, which is highly undesirable in those applications requiring the material to be dispensed in a finely divided state.

Various prior art devices have been proposed to meet all the above requirements, but none have proven satisfactory.

SUMMARY OF THE INVENTION

The disclosed invention comprises a dispensing apparatus which is relatively inexpensive to construct and maintain, and which meets all the above requirements. More particularly, the novel dispenser utilizes a squirrel cage tumbler having a concentrically mounted, specially designed auger. The tumbler is rotatably mounted in the cylindrical interior of a housing, with the auger rotatably received in a split tube mounted on an end wall of the housing. The split tube extends through the end wall to provide an exit path for flowable material. The housing has a readily accessible opening with a removable cover through which the flowable material may be conveniently introduced to the housing interior. Rotary motion is imparted to the tumbler by a motor having a pulley, a second pulley attached to the tumbler and a timing belt which is reeved about both pulleys.

As set forth below in more detail, rotation of the squirrel cage causes agglomerated clusters of the flowable material to be broken up into small particles, while rotation of the auger in the split tube causes the flowable material to be ejected at a predetermined rate without packing.

For a fuller understanding of the nature and advantages of the invention, reference should be had to the following detailed description, taken in conjunction with the accompanying drawings.

DESCRIPTION OF THE PREFERRED EMBODIMENT

Figure 1:
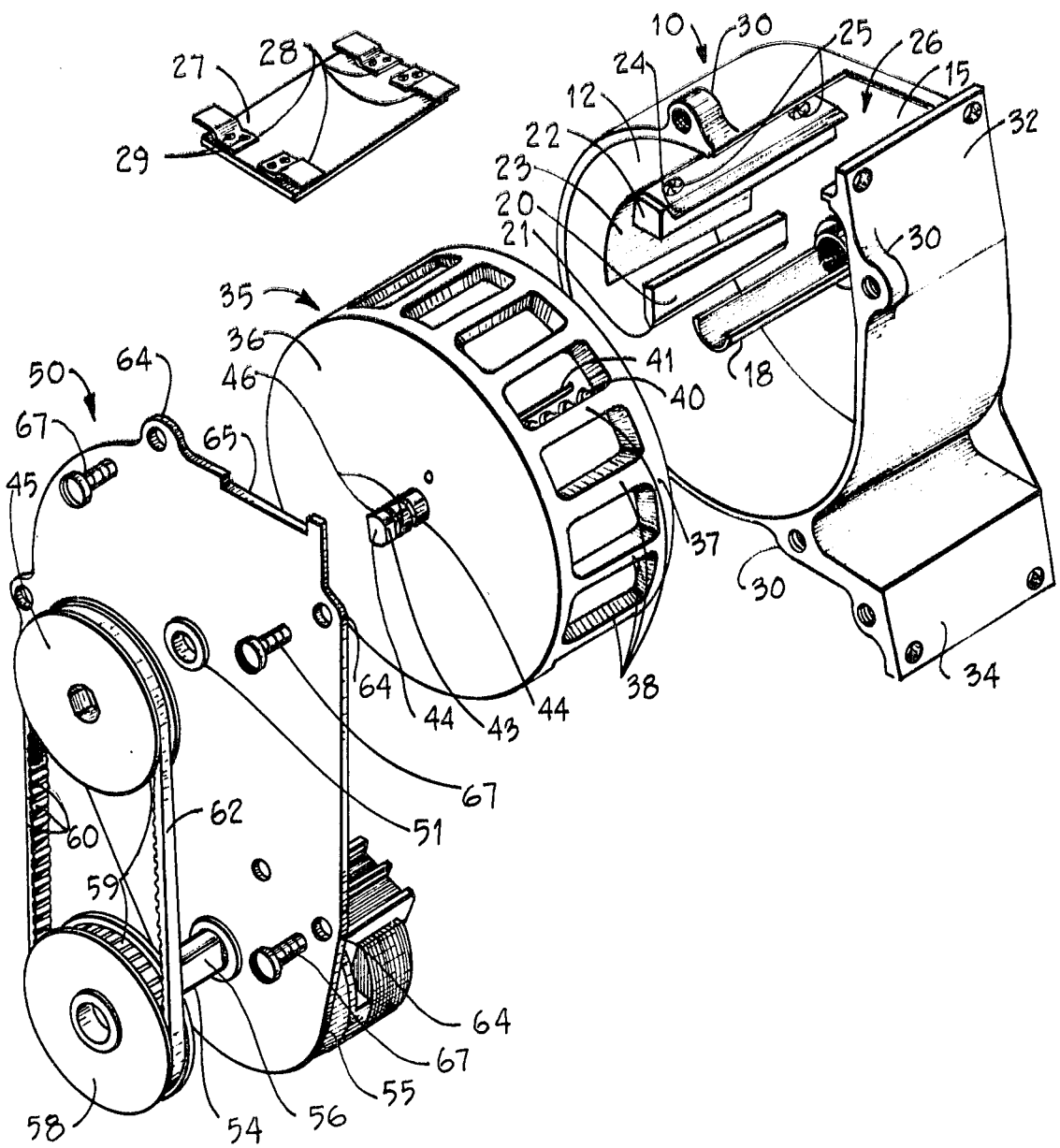
FIG. 1 is an exploded view of a preferred embodiment of the invention.

Turning now to the drawings, FIG. 1 illustrates an exploded view of a preferred embodiment of the invention suitable for use as a toner dispenser in an electrostatic copier. A housing 10, having an irregular exterior configuration, has a substantially cylindrical interior wall, generally indicated at 12, which is contoured to receive a squirrel cage tumbler 35. End wall 15 of housing 10 has a centrally located bore 16 (see FIG. 2) into which is firmly secured a tube 18 which is split longitudinally along substantially the entire portion thereof located in the interior of housing 10 to form a trough portion. Tube 18 is secured to end wall 15 in any suitable fashion, e.g. by press fitting or soldering. Bore 16 and tube 18 are preferably located at the center of curvature of the cylindrical interior wall 12.

A bar 20 is mounted on end wall 15 of housing 10 adjacent and extending parallel to tube 18. As more clearly shown in FIG. 3, bar 20 has a rectangular cross section with a lower knife edge 21. As more fully discussed below, knife edge 21 serves to cleave and comminute large clusters of the material to be dispensed, in this case the toner material.

Also mounted on end wall 15 is a support 22 which extends parallel to tube 18 and bar 20. Support 22 carries a shield 23, which is fixed to the top side of support 22 by a pair of fasteners 25. As more clearly shown in FIG. 3, shield 23 has an arcuate cross section which follows the contour of wall 12. As more fully discussed below in conjunction with operation of the dispenser, shield 23 defines the inner wall of an upward flow path for toner material 72. Shield 23 may be formed from any malleable and resilient material such as brass. Both bar 20 and shield 23 may be mounted to end wall 15 in any suitable fashion, e.g. by forming a hole and press fitting.

The top of housing 10 is provided with a rectangular opening, indicated by 26, adapted to receive a rectangular cover 27. Cover 27 has four clips 28 arranged as shown to grip the outer surface of opening 26 when cover 27 is in place. Clips 28, which are preferably made of brass, are fixed to cover 27 by fasteners 29. The lower side surfaces of opening 26 are slotted slidably receive cover 27. Cover 27 may be inserted or removed by merely sliding it in the desired direction.

Housing 10 is provided with a plurality of external bosses 30 which are threaded to receive the mounting screws for a housing cover described below. Housing 10 is also provided with flat front portions 32 and 34 having mounting holes as shown for securing the dispenser to the mounting bolts of an electrostatic copier (not shown).

Tumbler 35 has a circular end plate 36, an annular end portion 37, and a plurality of interconnecting vanes 38. Each vane 38 is attached at one end to the inner side of the periphery of end plate 36 and at the other end to the inner side of the periphery of annular portion 37. Vanes 38 are spaced equiangularly about the periphery of plate 36 and annular portion 37. Tumbler 35 may be formed from a single piece of suitable material, e.g. aluminum, by machining. Alternatively, plate 36, end portion 37, and vanes 38 may first be individually formed from suitable materials and subsequently interconnected by welding, fusing, etc.

An auger 40, preferably made of nylon or Teflon is fixed to the center of plate 36 in the manner described below. A doctor rod 41, the function of which is described below, is fastened to plate 36 adjacent and parallel to auger 40.

Tumbler pulley shaft 42 extends outwardly (as viewed in FIG. 1) and to the left of plate 36. Shaft 42 has a pair of spaced peripheral slots 43 and 44 for receiving retaining clips (not shown) used to position and retain a tumbler pulley 45 described below. Shaft 42 also has a pair of opposing flats 46 for insertion through the similarly shaped central opening of tumbler pulley 45.

A housing cover 50 has a central bore provided with a bearing 51 for tumbler pulley shaft 42 and a lower bore provided with a bearing 52 (see FIG. 2) for the output shaft 54 of a motor 55. Both bearings 51 and 52 can be made of bronze, oilite, or any other suitable material known to those skilled in the art. Motor 55 is mounted on housing cover 50 by suitable mounting bolts (not shown) and is preferably a shaded pole 110-volt AC motor providing an output of 10-inch-pounds torque at 10–12 r.p.m. Out put shaft 54 has a flat 56 for locking a motor pulley 58 thereto to prevent slipping of motor pulley 58 about shaft 54 during rotation thereof.

Pulleys 45 and 58 are both standard timing belt pulleys each having a slotted hub 59 to accommodate the teeth 60 of a timing belt 62.

Housing cover 50 is provided with a plurality of apertured peripheral bosses 64 located in matching relationship with bosses 30 of housing 10. Housing cover 50 is provided with a plurality of apertured peripheral bosses 64 located in matching relationship with bosses 30 of housing 10. Housing cover 50 is further provided with a cutaway portion 65 slightly wider than the width of cover 27 to accommodate insertion and removal of cover 27.

To assemble, with motor 55 mounted on housing cover 50 and motor pulley 58 mounted on output shaft 54, tumbler pulley shaft 42 is inserted into bearing 51. Timing belt 62 is next reeved about both pulleys 45 and 58, after which tumbler pulley 45 is fitted onto tumbler pulley shaft 42. Tumbler pulley 45 is then locked onto tumbler pulley shaft 42 by snapping a pair of standard E-clips (not shown) into slots 43 and 44. Tumbler 35 is next fitted into the interior of housing 10 with auger 40 positioned centrally of tube 18. Housing cover 50 is then secured to housing 10 by retaining bolts 67, after which cover 27 is inserted. This completes assembly of the dispenser which is now ready to be installed in the copier apparatus. Since construction and operation of this apparatus is not considered necessary to an understanding of the invention it is not disclosed in detail herein.

Figure 2:
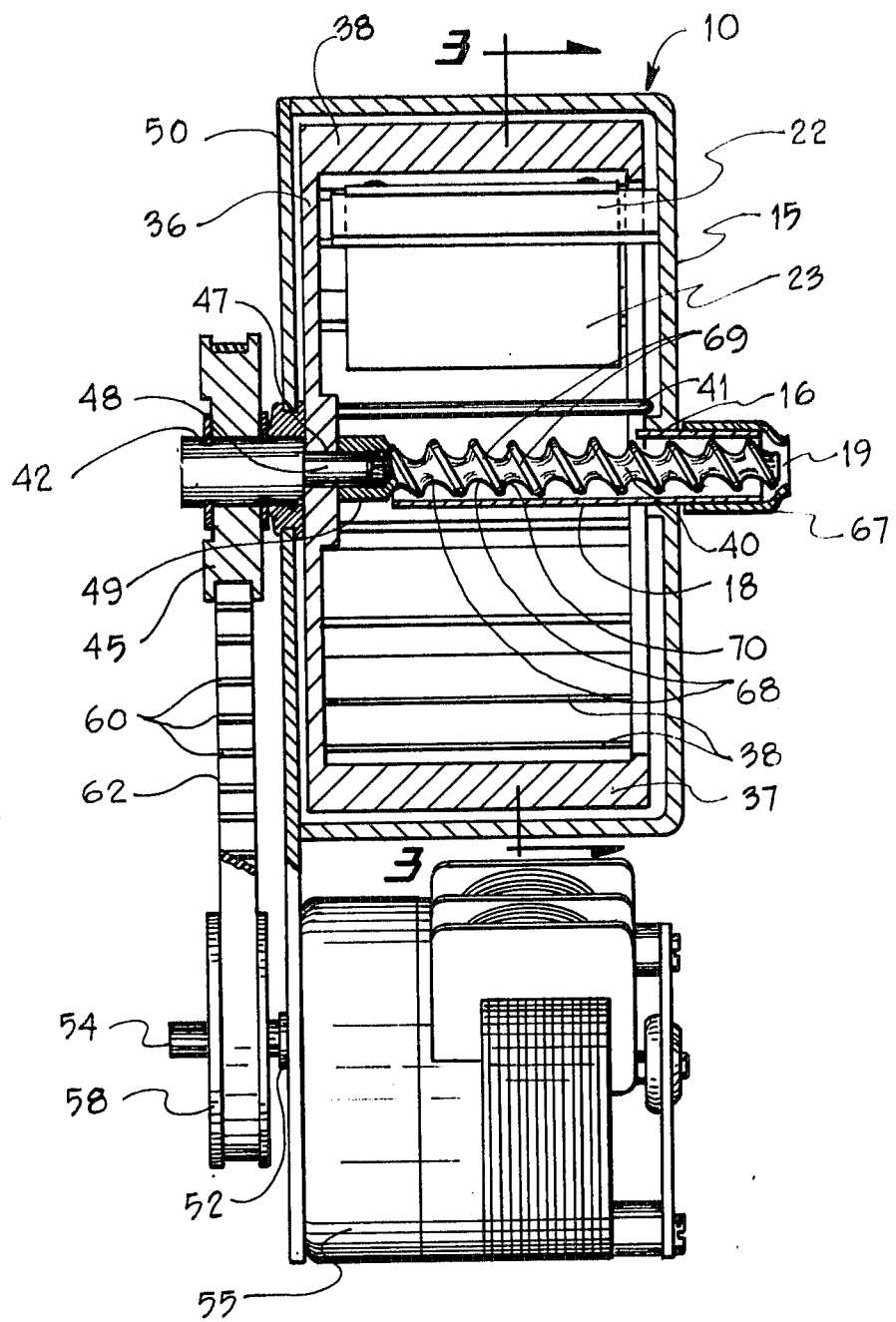
FIG. 2 is a sectional view taken along the lines II—II of FIG. 3.

As seen In FIG. 2, which is a cross section of an assembled dispenser, tumbler 35 has a central bore 47 which is friction fitted onto a reduced-diameter portion 48 of tumbler pulley shaft 42. Auger 40 has a hollow base portion 49 which is also friction fitted onto reduced diameter portion 48. To ensure a good friction fit, the inner diameter of bore 47 and auger base portion 49 are made slightly smaller than the diameter of shaft portion 48.

In the assembled dispenser, auger 40, which is rotatably received by tube 18, extends across the interior of housing 10 and past end wall 15. The tip of auger 40 is positioned adjacent the exit end 19 of tube 18. Although not considered indispensible to the operation of the invention a nozzle 67 is fitted onto the exit end 19 of tube 18 in the preferred embodiment shown. Nozzle 67 can be constructed of rubber, plastic, or any other suitable material.

As can be seen in FIG. 2, the flutes 68 of auger 40 are approximately semicircular in shape and quite deep while the lands 69 are narrow with a steep edge 70. This construction is preferred for those dispensers designed for use with material having high surface friction, such as the resin toner used in electrostatic copiers. The combination of steep trailing edge and deep semicircular flutes reduces the amount of radial thrust imparted by auger 40 to the material to be augered along tube 18, which correspondingly reduces the quantity of material which accumulates on the inner surface of tube 18. This, in turn, eliminates packing of the material into clusters as it moves along the flow path of tube 18 toward exit end 19.

As is evident from FIG. 2, tumbler 35 is positioned to provide sufficient clearance between the outer surfaces thereof and the closed interior formed by housing 10 and housing cover 50 to prevent binding of tumbler 35, as it is rotated by tumbler pulley 45 driven by motor pulley 58 through timing belt 62.

Figure 3:
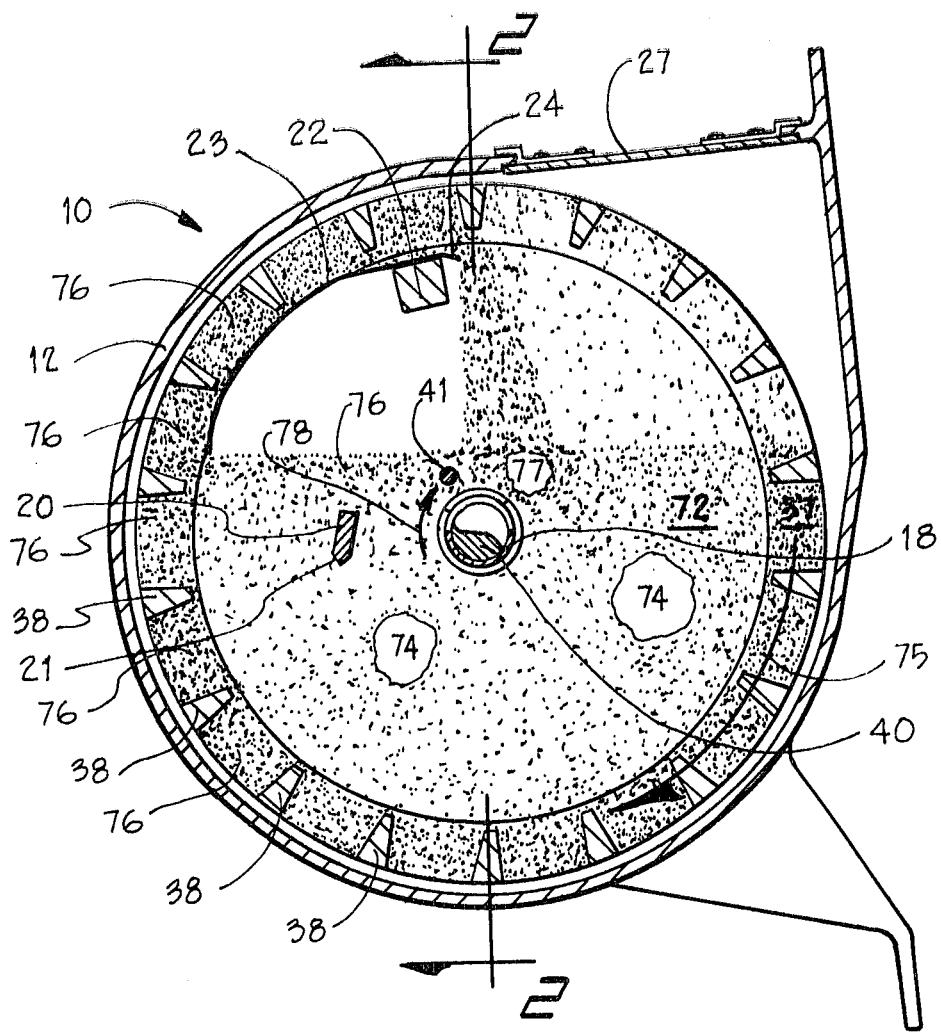
FIG. 3 is a schematic sectional view along the lines III—III of FIG. 2 illustrating the operation of the invention.

The operation of the toner dispenser of FIGS. 1 and 2 is best understood by reference to FIG. 3, which is a schematic cross section of the device as viewed from the left. The interior of the dispenser is shown filled to approximately two-thirds capacity with toner 72. Although the major part of toner 72 is usually in a powdered state, some portions thereof form clusters 74 under ordinary operating and storage conditions.

When tumbler 35 begins to rotate in the clockwise direction indicated by arrow 75, those portions of toner 72 located in the interstices 76 between the moving vanes 38 are transported in a clockwise direction from the lower portion of the interior along the channel formed by shield 23 and interior wall 12 to the upper portion. After moving past upper edge 24 of shield 23, toner 72 cascades down onto the upper surface 76 of the main body of toner 72. As tumbler 35 continues to rotate, other toner located in interstices 76 is transported to the top of the interior and cascaded down onto the upper surface 76 of the main body of toner 72. This cyclic transportation of toner 72 maintains it in a powdered, noncompacted state.

It has been found that as toner 72 is cycled, large clusters 74 in the main body of toner 72 have a tendency to migrate to the center along a spiral path centered about tube 18. Inevitably, all clusters 74 encounter knife edge 21 of bar 20 and are cleaved into smaller clumps by the combined action of knife edge 21 and the movement of toner 72. These smaller clumps then follow the path of cyclic movement already described and are further comminuted in the process of being transported to the top of the interior and cascaded back onto surface 76.

As rotating tumbler 35 recycles toner 72 in the manner described, auger 40 rotates therewith and conveys toner 72 along tube 18 to the exit end 19 thereof (see FIG. 2), from which the toner is ejected into a receptacle (not shown). It has been found that the dispenser operates very effectively over a wide range of rotational speeds. In the preferred embodiment, a rotational speed of 10 r.p.m., providing a metering rate or rate of ejection of toner, of 9 grams per hour was found to provide optimum dispensing conditions for resin toner.

Occasionally, a cluster 77 of toner 72 will migrate to a position directly above the trough portion of tube 18. To prevent such a solid mass of toner 77 from entering the auger feed path, doctor rod 41 is provided which rotates clockwise in a circular path indicated by arrow 78 concentric with tube 18. As doctor rod 41 rotates about tube 18, it urges any encountered cluster 77 away from the trough portion.

With prolonged operation, toner 72 is gradually depleted at the metering rate, and the level of surface 76 drops. Before the through portion of tube 18 becomes exposed above surface 76, however, the shower of cascaded toner 72 emanating from upper edge 24 of shield 23 maintains the trough portion of tube 18 supplied with a sufficient quantity of toner 72 to ensure an uninterrupted flow along the auger feed path to exit 19. It has been found that the disclosed dispenser will operate in a satisfactory fashion until nearly all the toner 72 has been metered out of the interior of the device. As is evident from the construction of the preferred embodiment disclosed herein, the dispenser may be quickly and easily replenished with a fresh supply of toner by merely removing cover 27, injecting the fresh toner, and replacing cover 27 by sliding it into place.

While the foregoing provides a full disclosure of the preferred embodiment of the invention it is understood that various modifications, alternate constructions, and equivalents may be employed without departing from the true spirit and scope of the invention. For example, tumbler 35 may be constructed with thin contoured vanes rather than the trapezoidal-shaped vanes disclosed above. Further, the dispenser may be used with many types of flowable material including other friable solids. Therefore, the above description and illustrations should not be construed as limiting the scope of the invention which is solely defined by the appended claims.

What is claimed is:

1. A dispenser for metering a precise amount of flowable material through an outlet comprising:
    a housing having an interior;
    a tumbler mounted in said interior of said housing for rotation about an axis;
    an auger fixed to said tumbler and rotatable therewith;
    a tube carried by said housing for receiving said auger and having an exit portion external to said housing for ejecting said flowable material from said interior; and
    a power means for rotating said tumbler, whereby rotation of said tumbler and said auger causes said flowable material located in said interior to be conveyed to said exit portion and ejected at a precise predetermined rate.

2. The dispenser of claim 1 wherein said tumbler comprises a squirrel cage having a generally circular first end member, a second end member having an annular shape and a plurality of substantially parallel vanes interconnected between said first and said second end members, said vanes being disposed about the outer portion of said members.

3. The dispenser of claim 2 wherein said squirrel cage further includes a doctor rod fixed to said circular end member substantially parallel to the axis of said auger.

4. The dispenser of claim 1 wherein said tube includes a trough portion located in said interior of said housing for receiving portions of said flowable material cascaded thereonto by said rotation.

5. The dispenser of claim 4 wherein said trough portion comprises a generally cylindrical split tube.

6. The dispenser of claim 1 further including a knife-edged bar mounted within said interior of said housing substantially parallel to said axis of rotation of said tumbler for cleaving agglomerated portions of said flowable material.

7. The dispenser of claim 1 wherein said power means comprises a motor, a first pulley coupled to said motor, a second pulley coupled to said tumbler, and a timing belt coupled to said first and said second pulleys for transmitting rotational motion therebetween.

8. The dispenser of claim 1 wherein said housing comprises first and second end members and an intermediate wall portion having a generally cylindrical interior shape, said wall portion having an opening for providing access to said interior and an associated removable cover.

9. The dispenser of claim 1 further including a support member mounted within said interior of said housing parallel to said axis of rotation of said tumbler and an arcuate shield fixed to said support member for defining an upward flow path for said flowable material.

10. The dispenser of claim 1 wherein said tube includes a nozzle coupled to said exit portion for directing the flow of said flowable material.